United States Patent
AuYoung et al.

(10) Patent No.: US 10,902,033 B2
(45) Date of Patent: Jan. 26, 2021

(54) POINT OF INTEREST ACCURACY USING TICKETS

(71) Applicant: Uber Technologies, Inc., San Francisco, CA (US)

(72) Inventors: Alvin AuYoung, San Jose, CA (US); Sheng Yang, Fremont, CA (US); Chandan Prakash Sheth, Fremont, CA (US); Livia Zarnescu Yanez, Menlo Park, CA (US); Chun-Chen Kuo, Palo Alto, CA (US); Shivendra Pratap Singh, Redwood City, CA (US); Vikram Saxena, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 479 days.

(21) Appl. No.: 15/829,634

(22) Filed: Dec. 1, 2017

(65) Prior Publication Data
US 2019/0171733 A1    Jun. 6, 2019

(51) Int. Cl.
| G06F 16/29 | (2019.01) |
| G06N 7/00 | (2006.01) |
| G06N 20/00 | (2019.01) |
| G06F 16/23 | (2019.01) |

(52) U.S. Cl.
CPC .......... G06F 16/29 (2019.01); G06F 16/2365 (2019.01); G06N 7/005 (2013.01); G06N 20/00 (2019.01); *G06F 2216/03* (2013.01)

(58) Field of Classification Search
CPC .. G06F 16/29; G06F 2216/03; G06F 16/2365; G06N 7/005; G06N 20/00
See application file for complete search history.

(56) References Cited

U.S. PATENT DOCUMENTS

| 9,886,794 | B2* | 2/2018 | van Os | G01C 21/00 |
| 2008/0163073 | A1* | 7/2008 | Becker | G06Q 30/00 |
| | | | | 715/753 |
| 2010/0153348 | A1* | 6/2010 | Perczynski | G06F 16/29 |
| | | | | 707/692 |
| 2011/0137808 | A1* | 6/2011 | Meyer | G06Q 10/0833 |
| | | | | 705/304 |
| 2011/0246148 | A1* | 10/2011 | Gupta | H04W 64/00 |
| | | | | 703/2 |
| 2012/0029817 | A1* | 2/2012 | Khorashadi | G01C 21/20 |
| | | | | 701/451 |
| 2012/0072287 | A1* | 3/2012 | Crane | G06Q 30/0261 |
| | | | | 705/14.58 |

(Continued)

*Primary Examiner* — Alicia M Willoughby
(74) *Attorney, Agent, or Firm* — Schwegman Lundberg & Woessner, P.A.

(57) ABSTRACT

Systems and methods for improving accuracy of geographic position data are provided. A networked system mines ticket data from content of the ticket. Based on the ticket data, a determination is made that the ticket indicates an issue with a trip involving a point of interest (POI). The networked system extracts trip data from a trip log corresponding to the trip involving the POI, and identifies, from a data storage, stored attributes of the POI. The networked system analyzes the ticket data, trip data, and attributes to determine a workflow to improve accuracy of the POI, whereby the analyzing comprises determining a priority level to verify accuracy of the POI. The workflow is triggered based on the priority level to verify accuracy of the POI.

20 Claims, 8 Drawing Sheets

(56) References Cited

U.S. PATENT DOCUMENTS

| | | | |
|---|---|---|---|
| 2012/0226518 A1* | 9/2012 | Haddad | G06Q 10/06316 705/7.28 |
| 2013/0212175 A1* | 8/2013 | Cheng | G06Q 10/107 709/204 |
| 2013/0326380 A1* | 12/2013 | Lai | G06F 3/0481 715/765 |
| 2014/0222723 A1* | 8/2014 | Narasimha | G06N 20/00 706/12 |
| 2015/0012501 A1* | 1/2015 | Xing | G06F 16/215 707/690 |
| 2015/0338234 A1* | 11/2015 | Seastrom | G01C 21/3679 701/409 |
| 2016/0147826 A1* | 5/2016 | Mishra | G01C 21/32 707/736 |
| 2017/0024640 A1* | 1/2017 | Deng | G06N 3/08 |
| 2017/0108348 A1* | 4/2017 | Hansen | H04W 4/44 |
| 2017/0177715 A1* | 6/2017 | Chang | G06F 40/186 |
| 2017/0264383 A1* | 9/2017 | Reddy | H04W 4/029 |
| 2018/0367954 A1* | 12/2018 | Reddy | H04W 4/029 |

\* cited by examiner

I had a different issue with my charge

Rider > Trips > Fare Review | Knowledge Base

Share Details

I requested (and confirmed with the driver) transport to Midway Airport in Chicago. I was taken to O'hare. I was picked up at 3:07 and arrived at my destination at 5:06 after spending 2 hours in the vehicle attempting to catch a flight. The driver was more than polite and I had no issues with him or his professionalism; however, I do not feel it's appropriate to be charged this fee for the reasons listed above. Thank you for your time.

FIG. 5

POINT OF INTEREST ACCURACY USING TICKETS

TECHNICAL FIELD

The subject matter disclosed herein generally relates to special-purpose machines that improve accuracy of geographic position data for a networked system, and to the technologies by which such special-purpose machines become improved compared to other similar special-purpose machines. Specifically, the present disclosure addresses systems and methods to improve point of interest (POI) accuracy using tickets.

BACKGROUND

Various systems maintain a catalog of places of interest (POI) that include a name, address, and in some cases, a geographic coordinate. A constant challenge in maintaining such a catalog is that the POI (e.g., business) may often close or move. In these situations, an update of the catalog is often slow to manifest or may never be updated resulting in stale data.

BRIEF DESCRIPTION OF THE DRAWINGS

Some embodiments are illustrated by way of example and not limitation in the figures of the accompanying drawings.

FIG. 5 is an example ticket, according to some example embodiments.

DETAILED DESCRIPTION

Figure 1:
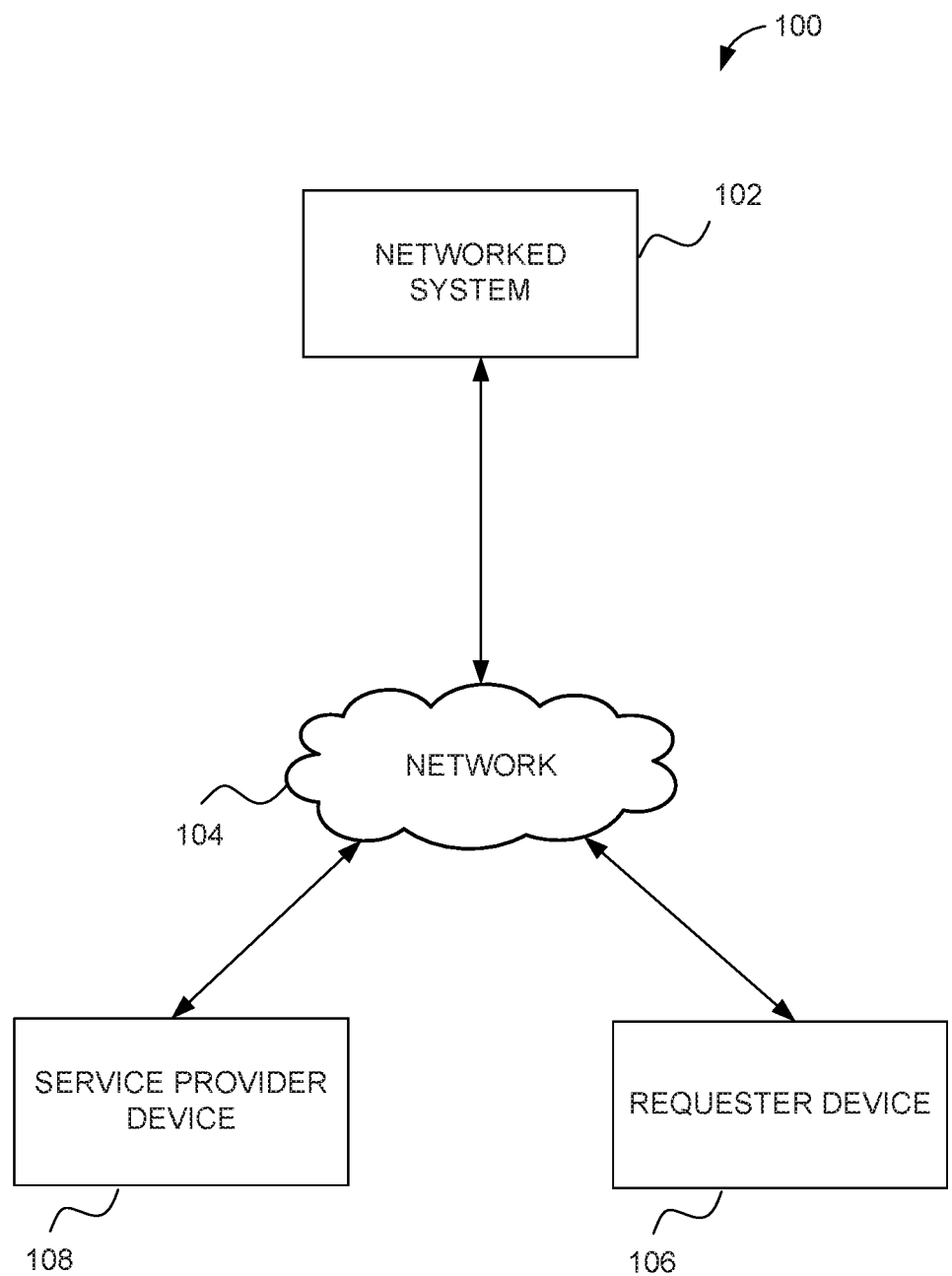
FIG. 1 is a diagram illustrating a network environment suitable for improving point of interest (POI) accuracy using tickets, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide systems and methods to analyze reported incidents for trips (also referred to as a "tickets") in order to improve accuracy for a point of interest (POI) associated with the incidents. In example embodiments, a technical solution involves systems and methods that analyze, using algorithms, tickets, trip logs, and POI attributes in order to determine a workflow for improving accuracy of the POI (e.g., verifying a correct address or coordinates). In example embodiments, a networked system obtains and stores trip logs. The stored trip logs each comprises information pertaining to a service provided between a pick-up location (PU) and a drop-off location (DO). The service may comprise a transportation service or a delivery service (e.g., food or goods delivery). The networked system periodically receives or accesses tickets, and extracts ticket data (also referred to as "incident data") from content of the tickets. Using the ticket data, the networked system identifies one or more tickets relevant to point of interest (POI) analysis, whereby each ticket indicates an issue with a service, such as a transportation service. The extracted ticket data may include a ticket identifier, which is then used to identify the corresponding trip log associated with a ticket and the service in which the incident occurred. The networked system then determines trip data from the trip log. Each service is associated with the POI with the POI being either a PU or a DO. Attributes of the POI (e.g., static metadata about the POI such as longitude and latitude, address, category of place) are also identified, from a data storage, by the networked system. The networked system performs an analysis using the ticket data, trip data, and attributes to determine a workflow for improving accuracy of the POI (e.g., the correct address; correct longitude and latitude). The workflow is then implemented by various components of the networked system.

In example embodiments, the workflow is based on a priority level determined by the POI analysis. For example, if the priority level is high, a workflow controller triggers an operator (e.g., human operator, machine operator) associated with an operator engine to verify the accuracy of the POI. Alternatively, if the priority level is medium, the workflow controller triggers a user generated content (UGC) process. The UGC process comprises causing user interfaces to be presented on a user device of a user that has an association with the POI. For example, the user may be a driver or a rider traveling from the POI (e.g., a PU) or to the POI (e.g., a DO). The user interface presents a query regarding the POI (e.g., which address for the POI is most correct?). A response to the query from one or more users is then used to verify the address or location of the POI. In a further example, if the priority level is low, the ticket data is stored to the data storage until additional data (e.g., additional tickets) is accumulated for the POI.

Thus, example methods (e.g., algorithms) and example systems (e.g., special-purpose machines) are configured to improve the accuracy of the geographic position data of a POI. In particular, example embodiments provide mechanisms and logic that utilizes tickets, trip logs, and attributes of the POI in order to determine a workflow for improving accuracy of the POI and to trigger the workflow. As a result, one or more of the methodologies described herein facilitate solving the technical problem of improving the accuracy of geographic position data, and more specifically improving accuracy of the POI (e.g., accuracy of an address, location, route taken).

FIG. 1 is a diagram illustrating a network environment 100 suitable for improving accuracy of geographic position data for a POI, according to some example embodiments. The network environment 100 includes a networked system 102 communicatively coupled via a network 104 to a requester device 106 and a service provider device 108. In example embodiments, the networked system 102 comprises components that analyze tickets, trip logs, and POI attributes in order to determine and implement a workflow for verifying accuracy of a POI. The components of the networked system 102 is described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the requester device 106 and the service provider device 108 are portable electronic devices such as smartphones, tablet devices, wearable computing devices (e.g., smartwatches), or similar devices. Alternatively, the service provider device 108 can correspond to an on-board computing system of a vehicle. The requester device 106 and the service provider device 108 comprises one or more processors, memory, touch screen displays, wireless networking system (e.g., IEEE 802.11), cellular telephony support (e.g., LTE/GSM/UMTS/CDMA/HSDP A), and/or location determination capabilities. The requester device 106 and the service provider device 108 interact with the networked system 102 through client applications stored thereon. The client applications of the requester device 106 and the service provider device 108 allow for exchange of information with the networked system 102 via user interfaces. The client applications running on the requester device 106 and the service provider device 108 may also determine location information of the requester device 106 and the service provider device 108 (e.g., latitude and longitude for a PU or a DO of a trip), and provide the location information (e.g., a route taken during a trip) to the networked system 102 for storage as part of trip logs. These trip logs are used by the networked system 102 to improve the accuracy of geographic position data addresses of POI; closed POI, new location; temporary location).

In example embodiments, a user operates the requester device 106 that executes the client application (e.g., not shown) to communicate with the networked system 102 to make a request for transport or delivery service (referred to collectively as a "trip"). In some embodiments, the client application determines or allows the user to specify a pick-up location (PU) (e.g., of the user or an item to be delivered) and to specify a drop-off location (DO) for the trip. For example, the PU or the DO may be an address or name of a location inputted by the user on a user interface provided via the client application, or the PU corresponds to a current location of the requester device 106 as automatically determined by a location determination module (not shown) in the requester device 106 (e.g., a global positioning system (GPS) component). In some embodiments, the networked system 102 recommends the PU or DO based on historical trip data associated with the user. In example embodiments, the client application provides a current location (e.g., coordinates such as latitude and longitude) of the requester device 106 to the networked system 102. The client application also presents information, from the networked system 102 via user interfaces, to the user of the requester device 106, such as address verification requests (e.g., query to verify a new address determined by the networked system 102).

A second user operates the service provider device 108 to execute a client application (not shown) that communicates with the networked system 102 to exchange information associated with providing transportation or delivery service to the user of the requester device 106. The client application presents information via user interfaces to the user of the service provider device 108, such as invitations to provide transportation or delivery service, navigation instructions, and address or attribute verification requests (e.g., query to verify the new address). The client application also provides a current location (e.g., coordinates such as latitude and longitude) of the service provider device 108 to the networked system 102, whereby the current location may comprise a PU or DO of a POI or indicate a route taken by the second user. Depending on implementation, the current location may be a location corresponding to the current location of the service provider device 108 as determined automatically by a location determination module (not shown) in the provider client device 122. In example embodiments, the PU or the DO corresponds to an address for a POI and are associated with coordinates (e.g., latitude and longitude) based from either a location of the requester device 106 or the service provider device 108 when a trip starts and/or when the trip ends. The various information received during a trip from the requester device 106 and the service provider device 108 are received by the networked system 102 and stored as trip logs in a data store (e.g., a trip log data store).

In some cases, an issue may occur during the trip. In these cases, a user via their requester device 106 or service provider device 108 may report an incident for the trip. The reported incident results in a ticket being generated. Example embodiments uses data from the ticket (or data from a number of tickets for a same POI) in connection with other stored information associated with the POI to determine accuracy for the POI as will be discussed in more detail below.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of service provider devices 108 or requester devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. While only a single networked system 102 is shown, alternative embodiments may contemplate having more than one networked systems 102 to perform server operations discussed herein for the networked system 102.

Figure 2:
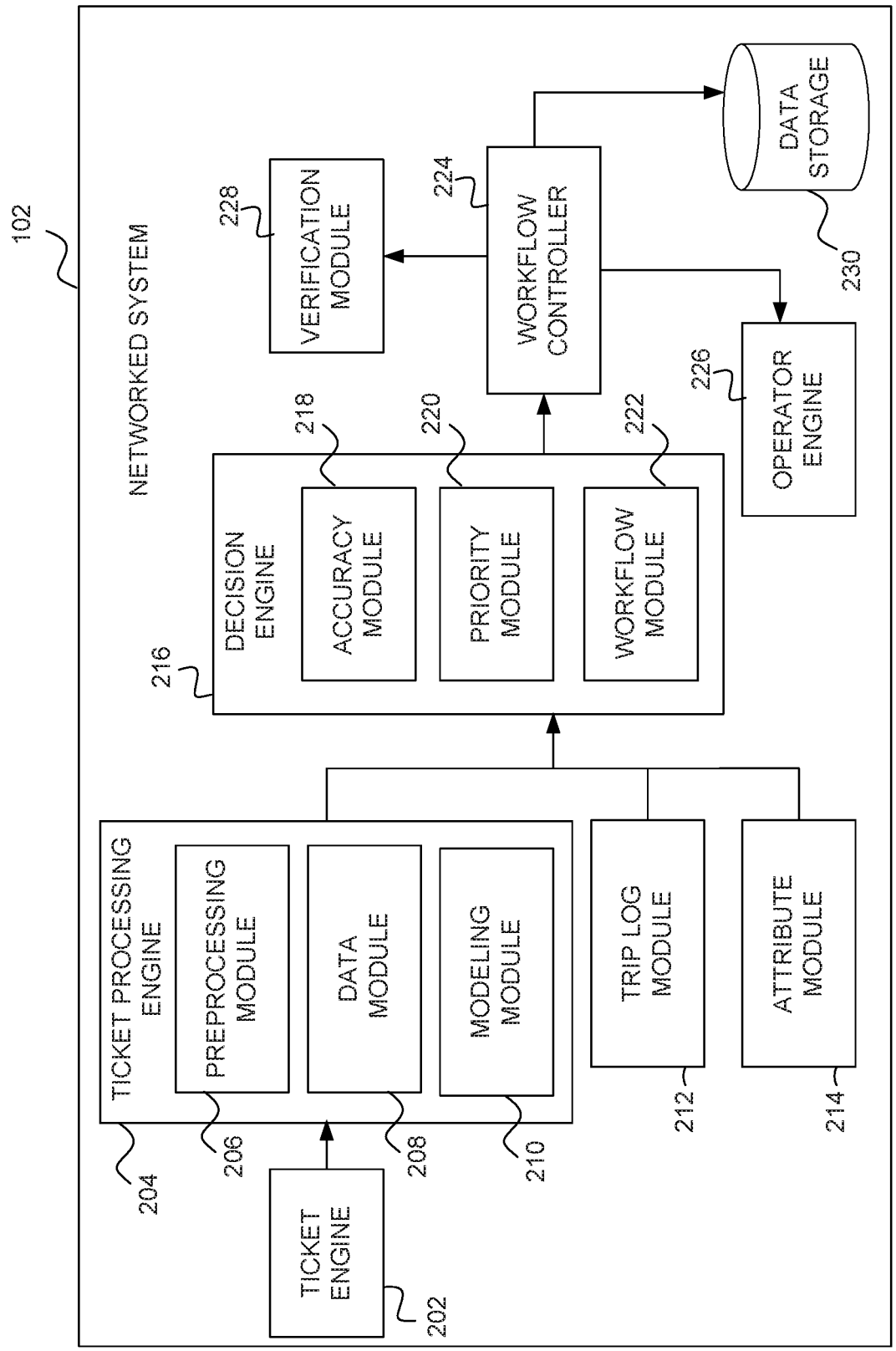
FIG. 2 is a block diagram illustrating components of a networked system, according to some example embodiments.

FIG. 2 is a block diagram illustrating components of the networked system 102, according to some example embodiments. In various embodiments, the networked system 102 stores trip logs, receives tickets reporting incidents involving points of interest, performs analysis to determine whether a workflow for determining an accuracy of a POI associated with one or more tickets should be triggered, and triggers the workflow accordingly. To enable these operations, the networked system 102 comprises a ticket engine 202, a ticket processing engine 204 having a preprocessing module 206, a data module 208, and a modeling module 210, a trip log module 212, an attribute module 214, a decision engine 216 having an accuracy module 218, a priority module 220, and a workflow module 222, a workflow controller 224, an operator engine 226, a verification module 228, and one or more data storage 230 all configured to communicate with each other (e.g., via a bus, shared memory, or a switch). The networked system 102 may also comprise other components (not shown) that are not pertinent to example embodiments. Furthermore, any one or more of the components (e.g., engines, controllers, modules, storage) described herein may be implemented using hardware (e.g., a processor of a machine) or a combination of hardware and software. Moreover, any two or more of these components may be combined into a single component, and the functions described herein for a single component may be subdivided among multiple components.

The ticket engine 202 is configured to receive and store tickets each indicating an incident involving a trip from a PU to a DO. The incident may indicate any issue that a user (e.g., a rider, a driver) experiences during the trip. For example, the incident may indicate a rude driver or passenger, an estimated time of arrival error at DO, an estimated time of departure error (e.g., pick-up time error), a wrong route being taken during the trip, a DO at a wrong location, a PU at a wrong location, a fare charged that was too much, or any other issue/complaint that a user may submit to the ticket engine 202.

The ticket processing engine 204 processes the tickets from the ticket engine to determine whether the incident is related to a POI issue (e.g., a location or routing issue). Accordingly, the ticket processing engine 204 accesses tickets stored by the ticket engine 202 and processes the tickets. The ticket processing engine 204 may perform the processing periodically (e.g., at a predetermined time such as once a week) or based on an event (e.g., receiving instructions to perform the processing, when a predetermined number of tickets are received).

The preprocessing module 206 preprocesses the tickets prior to the modeling module 208 and the data module 210 performing operations on the tickets. In example embodiments, the preprocessing module 206 uses natural language processing to correct for typographic errors (e.g., spelling or punctuation errors), for example, using a database or dictionary of common terms. The preprocessing module 206 also corrects for formatting issues that may have occurred when the ticket was generated (e.g., remove headings). In some embodiments, the preprocessing module 206 is optional.

Once the ticket is preprocessed, the data module 208 is configured to extract data (also referred to as "metadata") from content of the ticket that is used by the modeling module 210 and other components of the networked system 102 for analysis. The ticket may comprise place attributes, trip attributes, ticket text, and other things associated with the ticket such as its classification. As such, the data module 208 may extract, for example, geographic entity data (e.g., street, plaza), place category (e.g., café, shop, airport), an address, or a name of a POI (e.g., a DO). Additionally, the data module 208 determines a trip identify associated with the ticket. The trip identifier is used by the trip log module 212 to access a corresponding trip log.

The modeling module 210 is configured to determine whether each ticket involves a POI issue. While a user reporting the incident may label the incident a particular type (e.g., fare review, location incorrect, bad service), for example from a dropdown menu, the label may be incorrect or the incident does not involve accuracy of an POI. Using the metadata extracted by the data module 208, the modeling module 210 determines a probability that the ticket involves a POI. In example embodiments, the modeling module 208 use a classification model (e.g., binary classification model) to determine the probability that the ticket is related to a POI. In one embodiments, the classification model comprises a logistic regression model. In an alternative embodiment, the classification model comprises a classification tree model.

The trip log module 212 manages retrieval of trip data from trip logs. Accordingly, the trip log module 212 takes the trip identifier determined by the data module 212 and accesses the corresponding trip log from a data storage (e.g., the data storage 230). The trip data may comprise, for example, PU and DO along with corresponding coordinates or addresses, a route taken during the trip, cost, time of pick-up, and time trip is completed.

The attribute module 214 identifies attributes associated with the POI. The attribute module 214 accesses a data storage (e.g., the data storage 230) and retrieves attribute data for the POI such as, for example, a trip count for the POI within a predetermined time period (e.g., a number of trips to and/or from the POI), an address or coordinates for the POI (e.g., longitude and latitude), and a category associated with the POI (e.g., restaurant, airport, hospital, school). The category may indicate an importance level assignable to the POI. For example, accuracy for a hospital or an airport may be more important than for a restaurant.

The decision engine 216 is configured to perform analysis on the ticket data, trip data, and attribute data (e.g., from one or more tickets associated with the same POI) in order to determine a workflow for determining accuracy of the POI. In example embodiments, the decision engine 216 receives as input the ticket data, trip data, and attribute data. The analysis is performed by components of the decision engine 216 including the accuracy module 218, the priority module 220, and the workflow module 222.

The accuracy module 218 uses an accuracy model to derive an accuracy score. In one embodiment, the accuracy module 218 uses a deep learning model that takes ticket data (e.g., extracted ticket text) and examines specific sequence of characters or words in order to find patterns where sequences are more likely to occur where the place is incorrect (e.g., "wrong location" from a statement in the ticket stating "I was taken to the wrong location."). Based on a relative balance between words associated with incorrect places versus words associated with normal places, the accuracy module 218 derives an accuracy probability score. The accuracy module 218 determines whether the accuracy probability score transgresses a predetermined accuracy threshold thus indicating that the accuracy of the POI is low, questionable, or needs to be verified. If the accuracy probability score transgresses the predetermined accuracy threshold, then the decision engine 216 triggers the priority module 220 to determine a priority level for the POI.

The priority module 220 is configured to determine a priority level for the ticket if the accuracy probability score transgresses the predetermined accuracy threshold. The determination of the priority level takes into consideration attributes of the POI (e.g., from the attribute data). For example, if there are a small number of tickets associated with a POI that has a high trip count, the priority module 220 may rank the priority level as high if there is a chance that it is wrong because so many people are taking trips there. In another example, if there are a small number of tickets for a POI that is an important location (e.g., a hospital), the priority module 220 may rank the priority level as high since is important that the public be able to get to the POI quickly and accurately. As such, the networked system 102 may maintain a category tree and each POI is associated with one or more categories in the category tree, whereby each category is linked to a metric that indicates importance or an importance level. Thus, the priority module 220 takes into consideration attributes such as, for example, trip cost, trip length, trip count, and categories of POI, and uses a combination of any of these attributes along with corresponding metrics in determining the priority level.

In example embodiments, the priority module 220 uses a linear model to determine a priority score or level. For example, one linear model (or linear algorithm) may take the trip length, total cost, and trip count and calculate a weighted average and link the result with a business metric related to profit or user retention (e.g., based on whether the user opened the client application again within a certain timeframe; based on level of anger detected from the ticket—"will never use your services again!"). That is, the weighted sum can be used to come up with a priority score that is compared to one or more thresholds (e.g., stored in a priority level database or table) to determine the priority level. For instance, if a POI has a thousand trips, those trips tend to be very expensive, and a user has a bad experience on that trip, whereby the user is less likely to use the networked system 102 again for their transportation needs (e.g., based on context of the ticket), then the priority module 220 may assign a high priority level. However, if the trip is inexpensive or to a POI that is not popular, the priority module 220 may assign a low priority level.

The workflow module 222 determines a workflow for improving the accuracy of the POI. In example embodiments, the workflow is based on a priority level determined by the priority module 220. For example, if the priority level is high, the workflow process triggers an operator (e.g., human operator, machine operator) associated with an operator engine to verify the accuracy of the POI. Alternatively, if the priority level is medium, the workflow process triggers a user generated content (UGC) process. The UGC process comprises causing user interfaces to be presented on a user device of a user that has an association with the POI. For example, the user may be a driver or a rider traveling from the POI (e.g., a PU) or to the POI (e.g., a DO). The user interface presents a query regarding the POI (e.g., which address for the POI is most correct?). A response to the query from one or more users is then used to verify the address or location of the POI. In a further example, if the priority level is low, the ticket data is stored to the data storage until additional data (e.g., additional tickets) is accumulated for the POI.

The workflow controller 224 manages the triggering of the workflow determined by the workflow module 222. Thus, if the priority level is high, the workflow controller triggers (e.g., transmits instructions to) an operator engine 226 to verify the accuracy of the POI via an operator (e.g., human operator, machine operator). For example, the operator may immediately verify the accuracy of the POI by contacting the POI or searching for data from an external source (e.g., a website of the POD to determine a correct address or location.

Figure 6A:
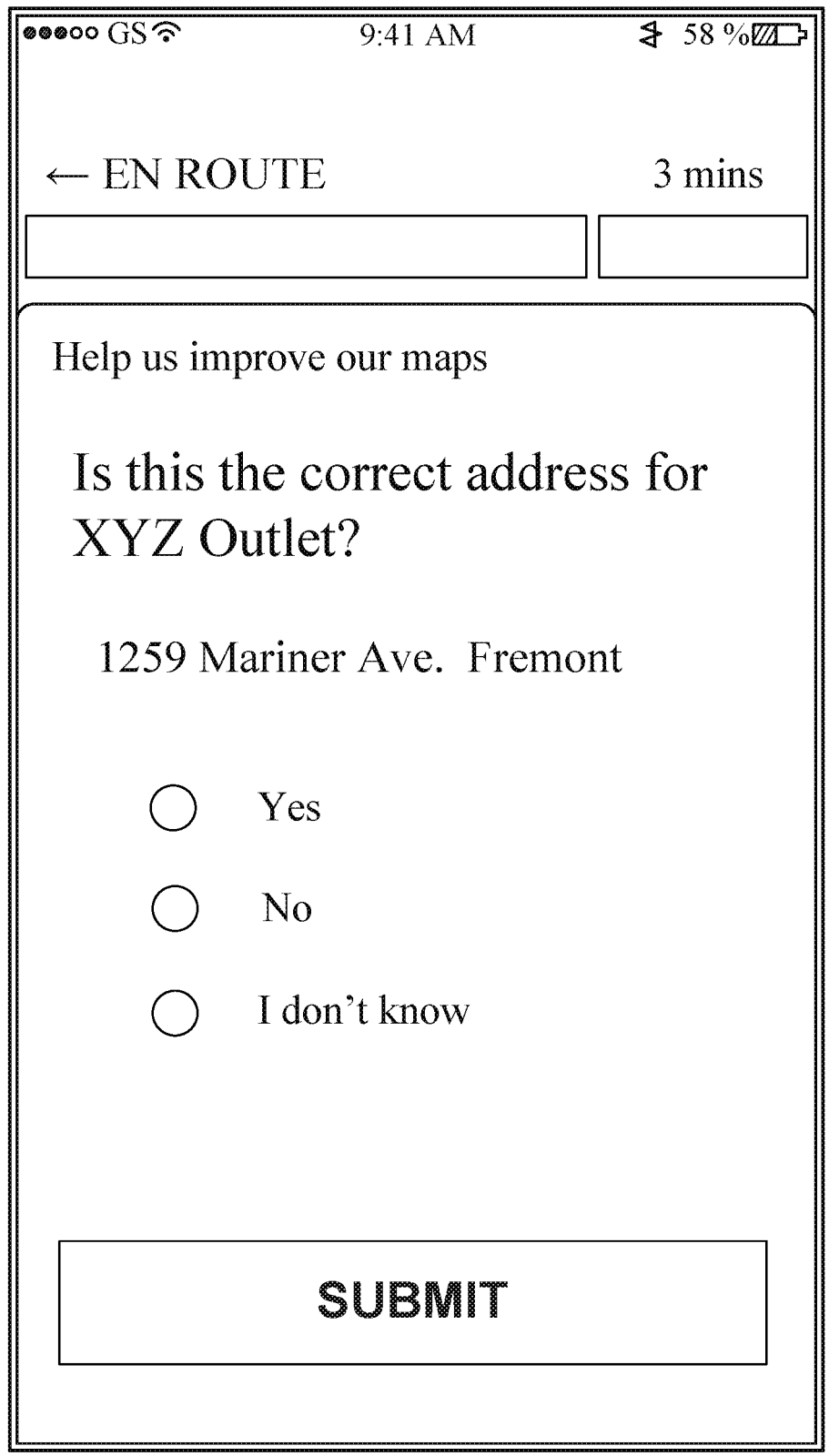
FIGS. 6A and 6B are example user interfaces used to illicit user generated content for verification of accuracy of POI.
Figure 6B:
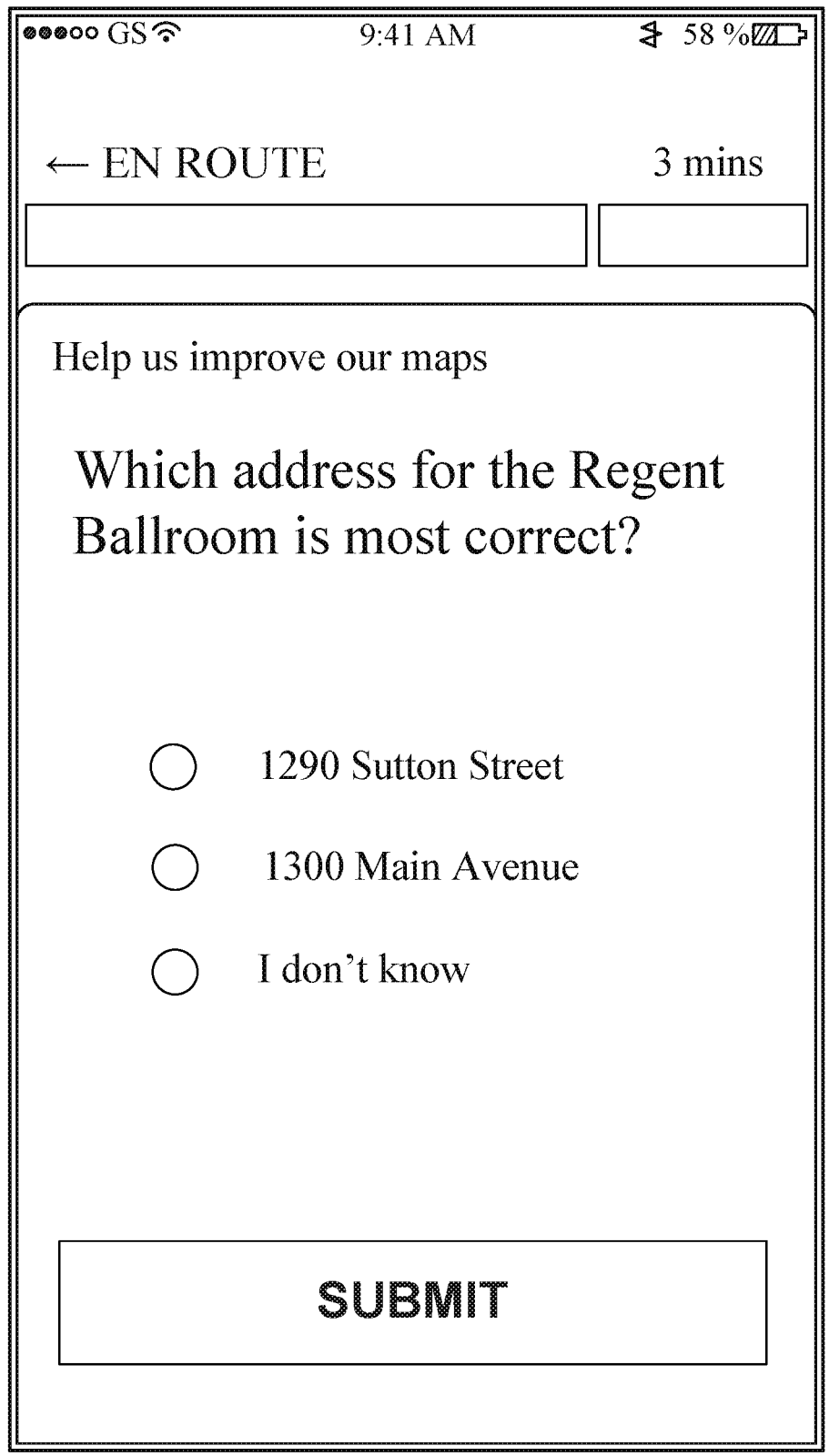

If the priority level is medium, the workflow controller 224 triggers the verification module 228 to perform a verification process. The verification process verifies accuracy of the POI (e.g., a location of the POI) using user generated content. In example embodiment, the verification module 228 triggers presentation of user interfaces to obtain user generated content. Specifically, the verification module 228 generates or causes the generation of a user interface that requests a user associated with the POI to verify accuracy for the POI. For example, the user may be an individual operating a requester device or service provider device that is traveling to (or have recently traveled to) the POI. A response from the requester device or service provider device is received and used to verify the accuracy (e.g., a location, an address, a route) by the verification module 228. Examples of user interfaces for verifying an address are shown in FIG. 6A and FIG. 6B.

If the priority level is low, the workflow controller 224 stores the ticket data to the data storage until additional data (e.g., from additional tickets) is accumulated for the POI. In some embodiments, the workflow controller 224 may store other information such as the scores/levels determined by the decision engine.

Figure 3:
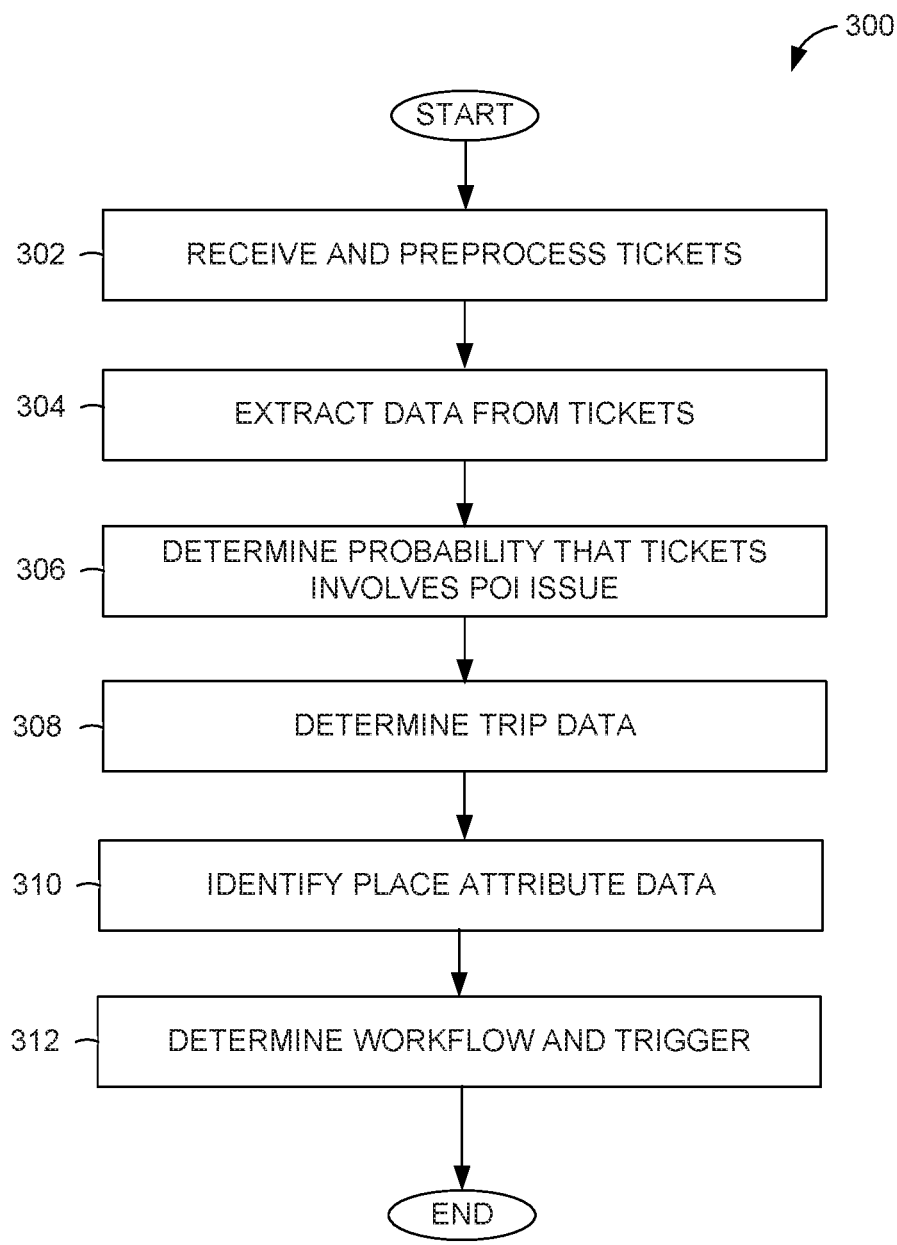
FIG. 3 is a flowchart illustrating operations of a method for improving POI accuracy using tickets, according to some example embodiments.

FIG. 3 is a flowchart illustrating operations of a method 300 for improving POI accuracy using tickets, according to some example embodiments. Operations in the method 300 may be performed by the networked system 102, using components described above with respect to FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, one or more tickets are received by the ticket engine 202 and preprocessed by the preprocessing module 206. In example embodiments, the preprocessing module 206 uses natural language processing to correct for typographic errors (e.g., spelling or punctuation errors). The preprocessing module 206 also corrects for formatting issues that may have occurred when the ticket was generated (e.g., remove headings). In some embodiments, operation 302 is optional.

In operation 304, the data module 208 extracts data from the ticket(s). Each ticket may comprise place attributes, trip attributes, ticket text, and other ticket data associated with the ticket such as its classification and trip identifier. As such, the data module 208 may extract, for example, geographic entity data (e.g., street, plaza), place category (e.g., cafe, shop, airport), an address, or a name of a POI (e.g., a DO). The data module 208 may also extract, for example by using natural language processing, phrases that indicate a potential issue with the trip (e.g., "wrong location," "U-turn," "too expensive," "wrong way") or a sentiment of the user (e.g., "I am angry.")

In operation 306, the modeling module 210 determines whether each ticket involves a POI issue. While a user reporting the incident may label the incident a particular type (e.g., fare review, location incorrect, bad service), the label may be incorrect or the incident does not involve accuracy of an POI. Using the data extracted by the data module 208 in operation 304, the modeling module 210 determines a probability that the ticket involves a POI. In one embodiment, the modeling module 208 use a logistic regression model to determine the probability that the ticket is related to a POI.

In operation 308, trip data is determined by the trip log module 212. In example embodiments, the trip log module 212 takes the trip identifier determined by the data module 212 in operation 304 and accesses the corresponding trip log from a data storage (e.g., the data storage 230). The trip log module 212 then determines (e.g., extracts, retrieves) trip data such as, for example, PU and DO, coordinates or addresses of PU or DO (whereby the PU or DO is the POI), a route taken during the trip, cost, time of pick-up, and time trip is completed. In some cases, the route taken during the trip may indicate a U-turn or a change in route or direction from an original route. Such trip data may indicate that the trip experienced an incident.

In operation 310, place attributes associated with the POI are identified by the attribute module 214. In example embodiment, the attribute module 214 accesses a data storage (e.g., the data storage 230) and retrieves place attribute data for the POI. The attribute data may comprise, for example, a trip count for the POI over a predetermined period of time (e.g., a number of trips to and/or from the POI), an address or coordinates for the POI (e.g., longitude and latitude), and a category associated with the POI (e.g., a restaurant, airport, hospital, school). The category may indicate an importance level for accuracy associated with the POI. For example, accuracy for a hospital or an airport may be more important than accuracy for a store.

In operation 312, a workflow is determined by the decision engine 216 and triggered by the workflow controller 224. Operation 312 is discussed in more detail in connection with the method of FIG. 4 below.

Figure 4:
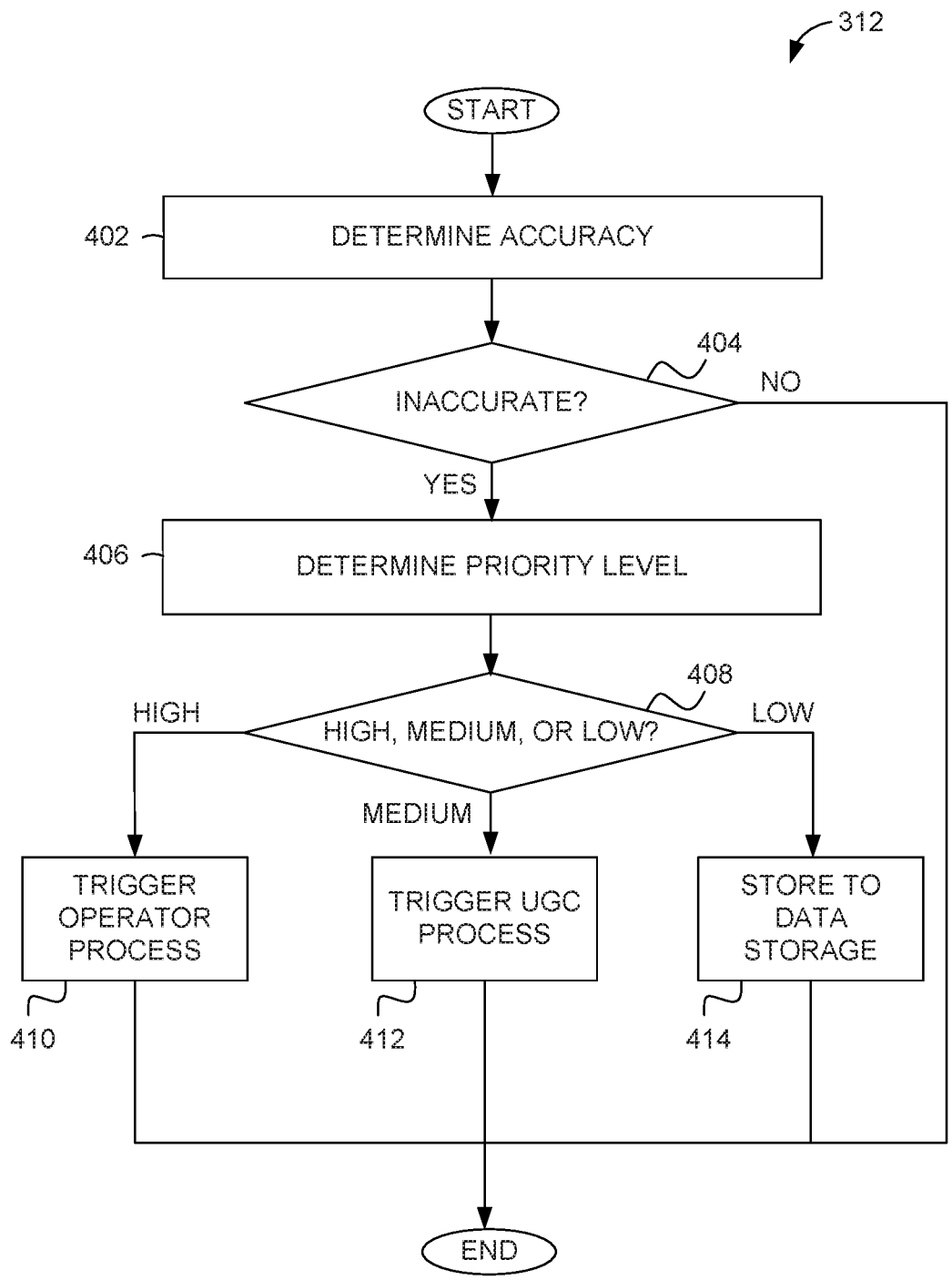
FIG. 4 is a flowchart illustrating operations of a method for determining a workflow for improving POI accuracy, according to some example embodiments.

FIG. 4 is a flowchart illustrating operations of a method (e.g., operation 312) for determining a workflow for improving POI accuracy, according to some example embodiments. Operations in the method may be performed by the networked system 102, using components described above with respect to FIG. 2. Accordingly, the method is described by way of example with reference to the networked system 102. However, it shall be appreciated that at least some of the operations of the method may be deployed on various other hardware configurations or be performed by similar components residing elsewhere in the network environment 100. Therefore, the method is not intended to be limited to the networked system 102.

In operation 402, accuracy of the POI is determined. In example embodiments, the accuracy module 218 uses an accuracy model to derive an accuracy score. In one embodiment, the accuracy module 218 uses a deep learning model that takes ticket data (e.g., ticket text) and examines specific sequence of characters or words in order to find patterns where sequences are more likely to occur where the place is incorrect (e.g., "wrong location" from a statement in the ticket stating "I was taken to the wrong location."). Based on a relative balance between words associated with incorrect places versus words associated with normal places, the accuracy module 218 derives an accuracy probability score.

In operation 404, a determination is made as to whether the POI is accurate. In example embodiments, the accuracy module 218 determines whether the accuracy probability score transgresses a predetermined accuracy threshold that indicates that the accuracy is not acceptable. If the accuracy probability score transgresses the predetermined accuracy threshold, then the POI is determined to have an accuracy issue.

In response to determining an accuracy issue with the POI, the decision engine 216 triggers the priority module 220 to determine a priority level for the POI in operation 406. In example embodiments, the priority module 220 uses a linear model to determine a priority score or level. For example, one linear model (or linear algorithm) may take various trip data (e.g., the trip length, total cost, and trip count) and calculate a weighted average and link the result with a business metric related to profit or user retention. That is, the weighted sum can be used to come up with the priority level. For instance, if a POI has a thousand trips, those trips tend to be very expensive, and a user has a bad experience on that trip, whereby the user is less likely to use the networked system 102 again for their transportation needs (e.g., based on context of the ticket), then the priority module 220 may assign a high priority level. However, if the trip is inexpensive or to a POI that is not popular, the priority module 220 may assign a low priority level.

The determination of the priority level also takes into consideration attributes of the POI (e.g., from the attribute data). For example, if there are a small number of tickets for a POI that has a high trip count, the priority module 220 may rank the priority level as high if there is a chance that it is wrong because so many people are taking trips there. In another example, if there are a small number of tickets for a POI that is an important location (e.g., a hospital), the priority module 220 may rank the priority level as high since is important that the public be able to get to the POI quickly and accurately. Thus, the priority module 220 takes into consideration attributes such as, for example, trip cost, trip length, trip count, and categories of POI, and uses a combination of any of these attributes in determining the priority level.

In operation 408, a determination of a workflow process is made based on whether the priority level is low, medium, or high. Thus, if the priority level is high, the workflow controller triggers (e.g., transmits instructions to) an operator process in operation 410. The operator process causes the operator engine 226 to verify the accuracy of the POI via an operator (e.g., human operator, machine operator). For example, the operator may immediately verify the accuracy of the POI by contacting the POI or searching for data from an external source (e.g., a website of the POI) to determine a correct address or location.

If the priority level is medium, the workflow controller 224 triggers a user generated content process as a verification process. That is, the verification process verifies accuracy of the POI (e.g., a location of the POI) using user generated content. In example embodiment, the verification module 228 triggers presentation of user interfaces to obtain user generated content. Specifically, the verification module 228 generates or causes the generation of a user interface that requests a user associated with the POI to verify accuracy for the POI. A response from the requester device or service provider device is received and used to verify the accuracy (e.g., a location, an address) by the verification module 228. Examples of user interfaces for verifying an address are shown in FIG. 6A and FIG. 6B.

If the priority level is low, the workflow controller 224 stores the ticket data to the data storage until additional data (e.g., additional tickets) is accumulated for the same POI. For example, a low priority level may change to a medium priority level if a threshold number of tickets involving accuracy of the POI is received. In some embodiments, the workflow controller 224 may store other information such as the scores/levels determined by the decision engine.

FIG. 5 is an example ticket, according to some example embodiments. The ticket is classified as fare review (e.g., contact type of the ticket) for example by the user (e.g., from a pulldown menu) or by the ticket engine 202. However, this classification may or may not be caused by a maps issue (e.g., a POI accuracy issue). As such, the ticket processing engine 204 mines ticket data geographic entity) from the ticket and performing modeling to determine whether the ticket involves a POI issue. In the ticket of FIG. 5, the user mentions Midway Airport and O'Hare. Therefore, the incident reported by the ticket involves a POI. The trip data from the trip log may show that a change in route occurred during the trip (e.g., first heading towards O'Hare and then changing directions to head to Midway). As such, the accuracy module 218 determines that a POI accuracy error occurred. Because a category associated with the POI (e.g., Midway) is an airport and likely has a high importance, the workflow module assigns a high priority level, and the workflow controller 224 triggers the operator engine 226.

FIGS. 6A and 6B are example user interfaces used to illicit user generated content for verification of accuracy of a POI location. For example, if the networked system 102. (e.g., the verification module 226) detects that a user (e.g., a user at a requester device) entered that they are going to a POI (e.g., by entering the name of the POI or an address associated with the POI), the networked system 102 provides a user interface to query the user whether the location is accurate for the POI.

Figure 7:
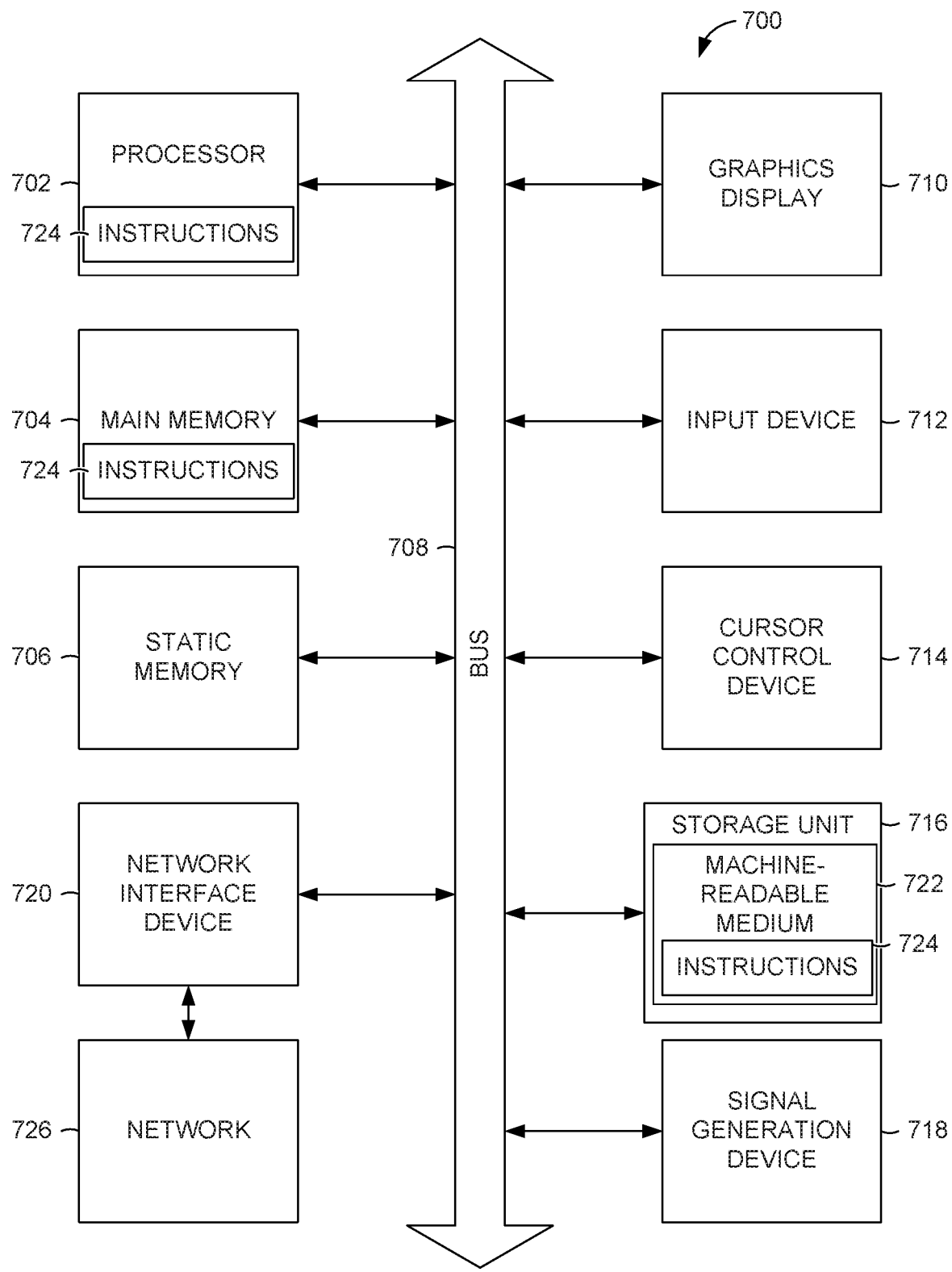
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 2 and 3. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and MD-ROM disks. The terms machine-storage media, computer-storage media, and device-storage media 722 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for improving accuracy of geographic position data. The system includes one or more processors and a memory storing instructions that, when executed by the one or more hardware processors, causes the one or more hardware processors to perform operations mining ticket data from content of the ticket; determining, based on the ticket data, that the ticket indicates an issue with a trip involving a point of interest (POI); extracting trip data from a trip log corresponding to the trip involving the POI; identifying, from a data storage, stored attributes of the POI; analyzing the ticket data, trip data, and attributes to determine a workflow to improve accuracy of the POI, the analyzing comprising determining a priority level to verify accuracy of the POI, the workflow being based on the priority level to verify accuracy of the POI; and triggering a workflow process based on the priority level.

In example 2, the subject matter of example 1 can optionally include wherein the priority level is high, and the workflow process comprises triggering an operator to verify the accuracy of the POI.

In example 3, the subject matter of examples 1-2 can optionally include wherein the priority level is medium, and the workflow process comprises triggering a user generated content (UGC) process, the UGC process comprising causing a user interface to be presented on a user device of a user that has an association with the POI, the user interface presenting a query regarding verifying the address; receiving a response to the query via the user interface from the user device; and using the response to verify the address.

In example 4, the subject matter of examples 1-3 can optionally include wherein the priority level is low, and the workflow process comprises storing the ticket data to the data storage in response to the priority level being low.

In example 5, the subject matter of examples 1-4 can optionally include wherein the determining that the ticket indicates an issue with a trip involving the POI comprises applying a classification model to the ticket data to determine a probability that the ticket is associated with the POI.

In example 6, the subject matter of examples 1-5 can optionally include wherein the classification model comprises a logistic regression model.

In example 7, the subject matter of examples 1-6 can optionally include wherein the mining ticket data from the content of the ticket comprises applying a natural language processing model to the ticket.

In example 8, the subject matter of examples 1-7 can optionally include wherein the extracting trip data from the trip log comprises detecting a change in routing during the trip or a drop-off location a threshold distance from an entered destination.

In example 9, the subject matter of examples 1-8 can optionally include wherein the determining the priority level comprises determining a priority score, the determining the priority score being based on one or more of a weighted average of trip counts to the POI; a weight average of trip cost to the POI, a metric of a category assigned to the POI, or a metric of likelihood of non-retention of a user associated with the ticket.

In example 10, the subject matter of examples 1-9 can optionally include wherein the analyzing further comprises determining, using a deep learning model, an accuracy score based on a sequence of characters from the ticket.

Example 11 is a method for improving accuracy of geographical position data. The method comprises mining ticket data from content of the ticket; determining, based on the ticket data, that the ticket indicates an issue with a trip involving a point of interest (POI); extracting trip data from a trip log corresponding to the trip involving the POI; identifying, from a data storage, stored attributes of the POI; analyzing, by one or more hardware processors, the ticket data, trip data, and attributes to determine a workflow to improve an accuracy of the POI, the analyzing comprising determining a priority level to verify accuracy of the POI, the workflow being based on the priority level to verify accuracy of the POI; and triggering a workflow process based on the priority level.

In example 12, the subject matter of example 11 can optionally include wherein the priority level is high, and the workflow process comprises triggering an operator to verify the accuracy of the POI.

In example 13, the subject matter of examples 11-12 can optionally include wherein the priority level is medium, and the workflow process comprises triggering a user generated content (UGC) process, the UGC process comprising causing a user interface to be presented on a user device of a user that has an association with the POI, the user interface presenting a query regarding verifying the address; receiving a response to the query via the user interface from the user device; and using the response to verify the address.

In example 14, the subject matter of examples 11-13 can optionally include wherein the priority level is low, and the workflow process comprises storing the ticket data to the data storage in response to the priority level being low.

In example 15, the subject matter of examples 11-14 can optionally include wherein the determining that the ticket indicates an issue with a trip involving the POI comprises applying a classification model to the ticket data to determine a probability that the ticket is associated with the POI.

In example 16, the subject matter of examples 11-15 can optionally include wherein the classification model comprises a logistic regression model or a classification tree model.

In example 17, the subject matter of examples 11-16 can optionally include wherein the extracting trip data from the trip log comprises detecting a change in routing during the trip or a drop-off location a threshold distance from an entered destination.

In example 18, the subject matter of examples 11-17 can optionally include wherein the determining the priority level comprises determining a priority score, the determining the priority score being based on one or more of a weighted average of trip counts to the POI; a weight average of trip cost to the POI, a metric of a category assigned to the POI, or a metric of likelihood of non-retention of a user associated with the ticket.

In example 19, the subject matter of examples 11-18 can optionally include wherein the analyzing further comprises determining, using a deep learning model, an accuracy score based on a sequence of characters from the ticket.

Example 20 is a machine-storage medium for improving geographic position data. The machine-storage medium configures one or more processors to perform operations comprising mining ticket data from content of the ticket; determining, based on the ticket data, that the ticket indicates an issue with a trip involving a point of interest (POI); extracting trip data from a trip log corresponding to the trip involving the POI; identifying, from a data storage, stored attributes of the POI; analyzing the ticket data, trip data, and attributes to determine a workflow to improve accuracy of the POI, the analyzing comprising determining a priority level to verify accuracy of the POI, the workflow being based on the priority level to verify accuracy of the POI; and triggering a workflow process based on the priority level.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory storing instructions that, when executed by the one or more hardware processors, causes the one or more hardware processors to perform operations comprising:
extracting ticket data from content of a ticket;
determining, based on the extracted ticket data, whether the ticket indicates an issue with a trip involving a point of interest (POI);
based on the determining, extracting trip data from a trip log corresponding to the trip involving the POI identified from the ticket;
identifying, from a data storage, stored attributes of the POI;
analyzing the extracted ticket data, extracted trip data, and attributes to select a workflow to improve accuracy of the POI, the analyzing comprising determining a priority level to verify accuracy of the POI, the determining the priority level comprises determining a priority score based on two or more of a weighted average of trip counts to the POI, a weight average of trip costs to the POI, a weighted average of trip lengths, a metric of a category assigned to the POI, or a metric of likelihood of non-retention of a user associated with the ticket, the workflow being selected from a plurality of different workflows based on the priority level; and
triggering the workflow selected based on the determined priority level.

2. The system of claim 1, wherein the priority level is high, and the workflow comprises triggering an operator to verify the accuracy of the POI.

3. The system of claim 1, wherein the priority level is medium, and the workflow comprises triggering a user generated content (UGC) process, the UGC process comprising:
causing a user interface to be presented on a user device of a user that has an association with the POI, the user interface presenting a query regarding verifying the address;
receiving a response to the query via the user interface from the user device; and
using the response to verify the address.

4. The system of claim 1, wherein the priority level is low, and the workflow process comprises storing the extracted ticket data to the data storage in response to the priority level being low.

5. The system of claim 1, wherein the determining whether the ticket indicates an issue with the trip involving the POI comprises using the extracted ticket data to determine a probability that the ticket involves the POI by applying a classification model to the extracted ticket data.

6. The system of claim 5, wherein the classification model comprises a logistic regression model.

7. The system of claim 1, wherein the extracting ticket data from the content of the ticket comprises applying a natural language processing model to the ticket.

8. The system of claim 1, wherein the extracting trip data from the trip log comprises detecting a drop-off location a threshold distance from an entered destination.

9. The system of claim 1, wherein the analyzing further comprises determining, using a deep learning model, an accuracy score based on a sequence of characters from the ticket.

10. A method comprising:
extracting ticket data from content of a ticket;
determining, based on the extracted ticket data, whether the ticket indicates an issue with a trip involving a point of interest (POI);
based on the determining, extracting trip data from a trip log corresponding to the trip involving the POI identified from the ticket;
identifying, from a data storage, stored attributes of the POI;
analyzing, by one or more hardware processors, the extracted ticket data, extracted trip data, and attributes to select a workflow to improve accuracy of the POI, the analyzing comprising determining a priority level to verify accuracy of the POI, the workflow being selected from a plurality of different workflows based on the priority level, the workflow comprising:
triggering an operator to verify the accuracy of the POI for a high priority level,
triggering a user generated content (UGC) process for a medium priority level, the operator being different from a user associated with the POI that is involved in the UGC process, and
storing the extracted ticket data to the data storage for a low priority level; and
triggering the workflow selected based on the determined priority level.

11. The method of claim 10, wherein the triggering the user generated content (UGC) process comprises:
causing a user interface to be presented on a user device of a user that has an association with the POI, the user interface presenting a query regarding verifying the address;
receiving a response to the query via the user interface from the user device; and
using the response to verify the address.

12. The method of claim 10, wherein the determining whether the ticket indicates an issue with the trip involving the POI comprises using the extracted ticket data to determine a probability that the ticket involves the POI by applying a classification model to the extracted ticket data.

13. The method of claim 12, wherein the classification model comprises a logistic regression model or a classification tree model.

14. The method of claim 10, wherein the extracting trip data from the trip log comprises detecting a drop-off location a threshold distance from an entered destination.

15. The method of claim 10, wherein the determining the priority level comprises determining a priority score, the determining the priority score being based on two or more of a weighted average of trip counts to the POI, a weight average of trip costs to the POI, a weighted average of trip lengths, a metric of a category assigned to the POI, or a metric of likelihood of non-retention of a user associated with the ticket.

16. The method of claim 10, wherein the analyzing further comprises determining, using a deep learning model, an accuracy score based on a sequence of characters from the ticket.

17. A method comprising:
extracting ticket data from content of a ticket;
determining, based on the extracted ticket data, whether the ticket indicates an issue with a trip involving a point of interest (POI);
based on the determining, extracting trip data from a trip log corresponding to the trip involving the POI identified from the ticket;
identifying, from a data storage, stored attributes of the POI;
analyzing the extracted ticket data, extracted trip data, and attributes to select a workflow to improve accuracy of the POI, the analyzing comprising determining a priority level to verify accuracy of the POI, the determining the priority level comprises determining a priority score based on two or more of a weighted average of trip counts to the POI, a weight average of trip costs to the POI, a weighted average of trip lengths, a metric of a category assigned to the POI, or a metric of likelihood of non-retention of a user associated with the ticket, the workflow being selected from a plurality of different workflows based on the priority level; and
triggering the workflow selected based on the determined priority level.

18. The method of claim 17, wherein the priority level is high, and the workflow comprises triggering an operator to verify the accuracy of the POI.

19. The method of claim 17, wherein the priority level is medium, and the workflow comprises triggering a user generated content (UGC) process, the UGC process comprising:
causing a user interface to be presented on a user device of a user that has an association with the POI, the user interface presenting a query regarding verifying the address;
receiving a response to the query via the user interface from the user device; and
using the response to verify the address.

20. The method of claim 17, wherein the priority level is low, and the workflow comprises storing the ticket data to the data storage in response to the priority level being low.

* * * * *

UNITED STATES PATENT AND TRADEMARK OFFICE
CERTIFICATE OF CORRECTION

| | | |
|---|---|---|
| PATENT NO. | : 10,902,033 B2 | Page 1 of 1 |
| APPLICATION NO. | : 15/829634 | |
| DATED | : January 26, 2021 | |
| INVENTOR(S) | : Au Young et al. | |

It is certified that error appears in the above-identified patent and that said Letters Patent is hereby corrected as shown below:

In the Claims

In Column 19, Line 62, in Claim 4, after "workflow", delete "process"

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*